United States Patent [19]
Grieve

[11] Patent Number: 5,180,493
[45] Date of Patent: Jan. 19, 1993

[54] ROTATING HYDROCYCLONE SEPARATOR WITH TURBULENCE SHIELD

[75] Inventor: Donald F. Grieve, La Honda, Calif.

[73] Assignee: Krebs Engineers, Menlo Park, Calif.

[21] Appl. No.: 760,590

[22] Filed: Sep. 16, 1991

[51] Int. Cl.$^5$ .................. B01D 45/12; B01D 17/038
[52] U.S. Cl. .................. 210/512.3; 209/144; 209/211; 55/459.1; 210/512.1
[58] Field of Search ........... 210/512.1, 512.2, 335, 210/787, 512.3; 209/144, 211; 55/459.1

[56] References Cited

U.S. PATENT DOCUMENTS

| | | | |
|---|---|---|---|
| 4,178,234 | 12/1979 | Bobo | 209/211 |
| 4,576,724 | 3/1986 | Colman et al. | 210/512.1 |
| 4,702,837 | 10/1987 | Lecoffre et al. | 210/512.3 |
| 4,721,565 | 1/1988 | Carroll | 210/231 |
| 4,749,490 | 6/1988 | Smyth et al. | 210/512.1 |
| 4,876,016 | 10/1989 | Young et al. | 210/512.1 |
| 4,964,994 | 10/1990 | Wakley et al. | 210/512.1 |
| 5,062,955 | 11/1991 | Sciamanna | 210/512.1 |

*Primary Examiner*—Robert A. Dawson
*Assistant Examiner*—David Reifsnyder
*Attorney, Agent, or Firm*—Flehr, Hohbach, Test, Albritton & Herbert

[57] ABSTRACT

Rotating hydrocyclone having an elongated cylinder with a side wall defining a separation chamber. A stationary inlet introduces a mixture of immiscible fluids into the chamber at high velocity in a tangential direction so that the mixture rotates about the axis of the chamber and produces a centrifugal force which tends to separate the fluids in accordance with their specific gravities. The cylinder is rotated about its axis to increase the rotation of the fluids and thereby increase the centrifugal force, with impeller vanes extending radially in an inward direction from the side wall of the cylinder near the inlet enhancing the rotation of the fluids with the cylinder. A first outlet is aligned with the axis of the cylinder for removing a fluid of lesser specific gravity from the chamber, and a second outlet is aligned tangentially with the cylinder for removing a fluid of greater specific gravity from the chamber. A tubular turbulence shield disposed coaxially of the chamber between the inlet and the first outlet and extends axially beyond the impeller vanes for isolating the first outlet from the effects of turbulence produced by fluids entering the chamber and interacting with the impeller vanes. The vanes are tapered to produce a gradual acceleration in the rotation of the fluids as they travel away from the inlet.

16 Claims, 3 Drawing Sheets

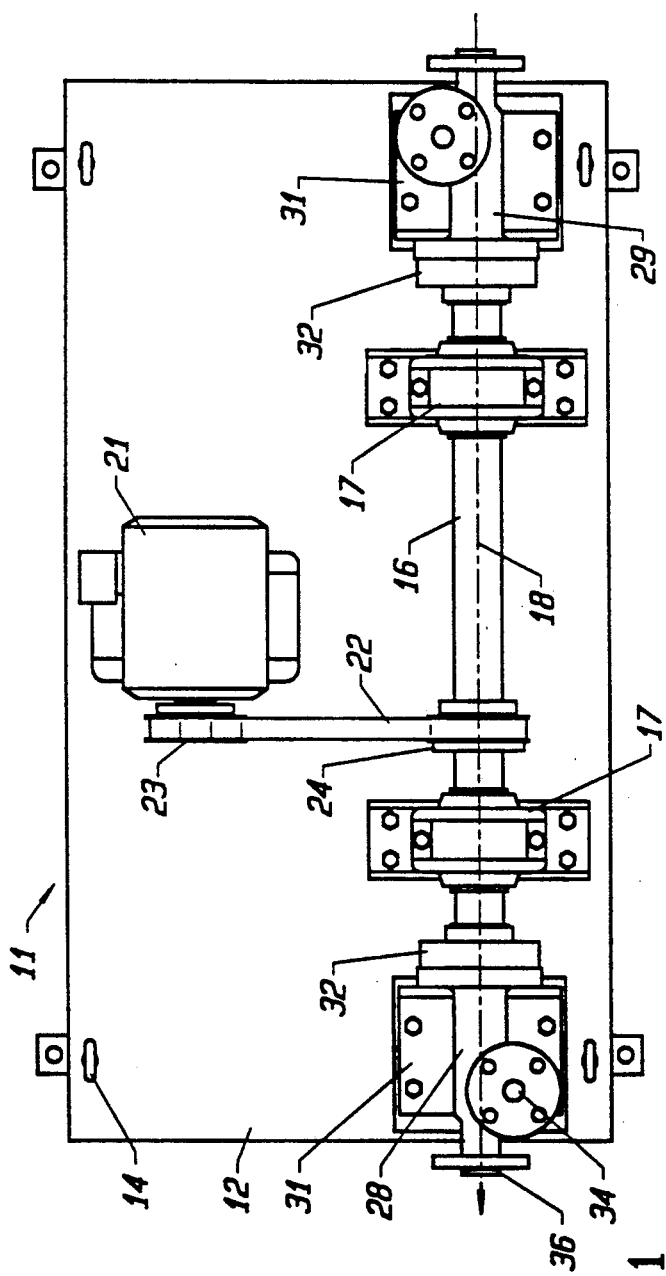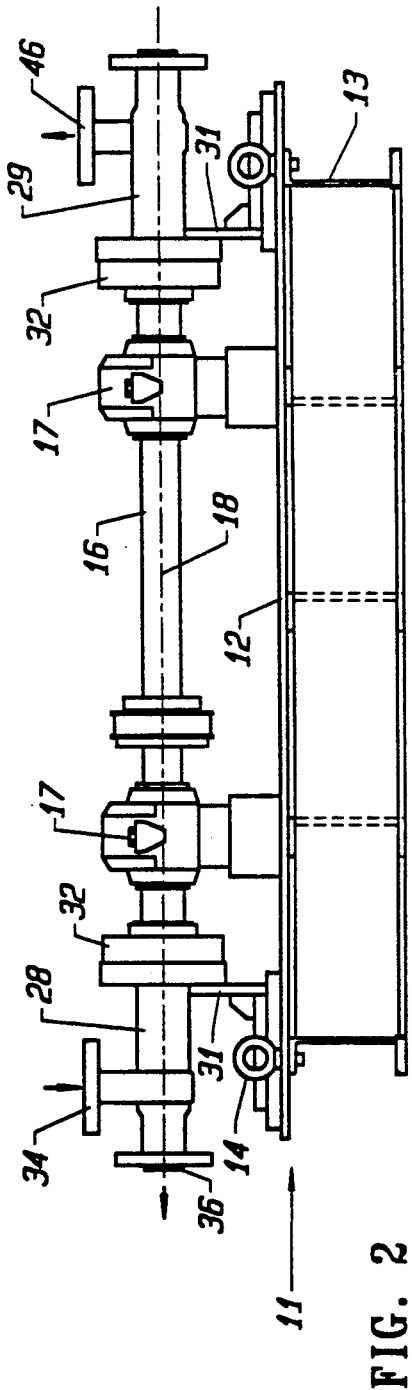

ROTATING HYDROCYCLONE SEPARATOR WITH TURBULENCE SHIELD

This invention pertains generally to centrifugal separators and, more particularly, to a rotating hydrocyclone which is particularly suitable for use in separating liquids such as oil and water.

Cyclone separators have heretofore been provided for separating a variety of materials in accordance with their specific gravities or densities. Such separators are utilized, for example, for separating solids and liquids in the mining and chemical processing industries and for separating different liquids in the petroleum industry.

In a liquid/liquid separator, the liquid is caused to rotate within a chamber to produce centrifugal forces which separate the liquid into components of greater and lesser density, with the lighter or less dense liquid being concentrated in a core at the axis of the chamber and the heavier or more dense liquid being concentrated toward the outer wall of the chamber. In some cyclones, the chamber is stationary, and in others it rotates to enhance the separation forces. The additional force produced by rotation of the chamber is particularly helpful in separating two liquids where greater separation forces are required than with a solid and a liquid or with two solids.

One example of a stationary cyclone with parameters optimized for separating oil and water is found in U.S. Pat. No. 4,964,994. Other examples of liquid/liquid separators with stationary chambers designed for separating oil and water are found in U.S. Pat. Nos. 4,576,724, 4,721,565 4,749,490 and 4,876,016.

The stationary separating chambers in these liquid/liquid cyclones typically have one or more conically tapered sections which are relative difficult and expensive to manufacture. The liquid is introduced into the chamber at high velocity in a tangential direction at or near the larger end of the conical section, and after passing through the conical section, the heavier or more dense liquid is removed through a so-called underflow outlet at the other end of the chamber. The lighter liquid which concentrates in a core at the axis of the chamber is removed through a so-called overflow outlet at the end of the chamber near the feed inlet.

The high velocity of the liquid at the feed inlet can create a turbulence which extends throughout the entire cross-section of the chamber near the inlet, producing instability in the core of lighter or less dense liquid and reducing the efficiency with which this portion of the liquid is collected at the overflow outlet. The turbulence can also produce a so-called "short circuiting" effect in which some of the incoming liquid passes directly to the overflow outlet without being separated into its heavier and lighter components.

U.S. Pat. No. 4,702,837 shows an oil/water separator in which a mixture of oil and water is introduced in an axial direction into the upstream end of a rotating cylindrical chamber, with the heavier water and the lighter oil being removed though annular and axial openings, respectively, at the downstream end of the chamber. With such a system, it is common to employ impeller type vanes to impart rotation to the liquid, and these rotating vanes produce a highly turbulent condition which causes short circuiting of the incoming mixture directly to the overflow outlet and also interferes with the thin, fragile core of oil, thus reducing the efficiency of the separator.

It is in general an object of the invention to provide a new and improved rotating hydrocyclone separator.

Another object of the invention is to provide a rotating hydrocyclone separator of the above character which overcomes the limitations and disadvantages of separators heretofore provided.

Another object of the invention is to provide a rotating hydrocyclone separator of the above character which is particularly suited for use in separating oil and water.

These and other objects are achieved in accordance with the invention by providing a hydrocyclone with an elongated cylinder having a side wall defining a separation chamber. A stationary inlet introduces a mixture of immiscible fluids into the chamber at high velocity in a tangential direction so that the mixture rotates about the axis of the chamber and produces a centrifugal force which tends to separate the fluids in accordance with their specific gravities. The cylinder is rotated about its axis to increase the rotation of the fluids and thereby increase the centrifugal force, with impeller vanes extending radially in an inward direction from the side wall of the cylinder near the inlet enhancing the rotation of the fluids with the cylinder. A first outlet is aligned with the axis of the cylinder for removing a fluid of lesser specific gravity from the chamber, and a second outlet is aligned tangentially with the cylinder for removing a fluid of greater specific gravity from the chamber. A tubular turbulence shield disposed coaxially of the chamber between the inlet and the first outlet and extends axially beyond the impeller vanes for isolating the first outlet from the effects of turbulence produced by fluids entering the chamber and interacting with the impeller vanes. The vanes are tapered to produce a gradual acceleration in the rotation of the fluids as they travel away from the inlet.

FIG. 1 is a top plan view of one embodiment of a hydrocyclone separator according to the invention.

FIG. 2 is a front elevational view of the embodiment of FIG. 1.

Figure 3:
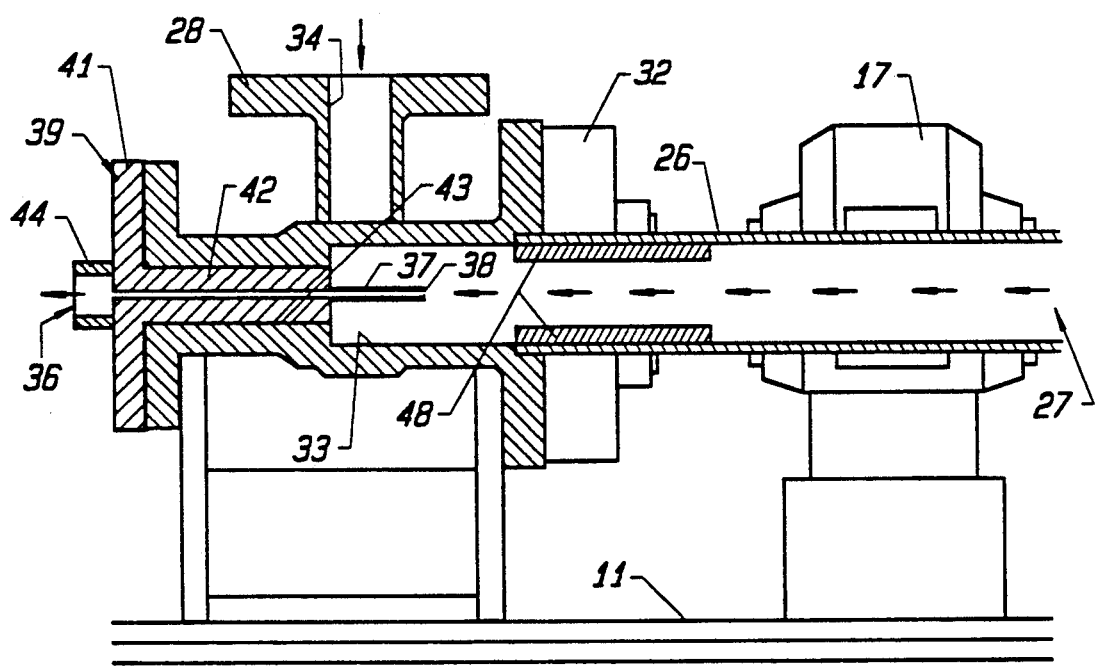
FIG. 3 is an enlarged fragmentary sectional view of the embodiment of FIG. 1.

As illustrated in the drawings, the hydrocyclone separator has a generally rectangular base 11 comprising a horizontally extending plate or deck 12 supported by a frame 13, with lifting rings 14 near the corners of the deck.

An elongated cylinder 16 of circular cross-section is rotatively mounted in pillow blocks 17 affixed to the base for rotation about its axis 18. A drive motor 21 is mounted on the base, with a gearbelt 22 trained about pulleys 23, 24 on the motor shaft and cylinder for rotating the cylinder about its axis. The cylinder has a side wall 26 surrounding a chamber 27 through which the fluids to be separated are passed. The chamber can be of any suitable length and diameter, and in one present embodiment has a length on the order of 24 inches and a diameter on the order of two inches.

An inlet head 28 and an outlet head 29 are mounted in stationary positions on mounting brackets 31 affixed to the base at opposite ends of the cylinder, with rotary seal assemblies 32 providing fluid-tight seals between the heads and the cylinder. The inlet head has an axial bore 33 which forms one end portion of chamber 27, with an involute or tangential feed inlet 34 for introducing a mixture of fluids such as oil and water into the chamber at high velocity in a tangential direction. The tangential velocity causes the fluids to rotate within the chamber as they pass through it from the inlet head toward the outlet head, producing centrifugal forces which separate the fluids according to their densities or specific gravities, with the heavier or more dense fluids being concentrated near the outer wall of the chamber and the lighter or less dense fluid being concentrated near the axis. The feed inlet can be of any suitable cross-sectional shape and size, such as oval, round or rectangular.

The inlet head also includes an axial overflow outlet 36 through which the lighter or less dense fluid is removed from the chamber. As illustrated in FIG. 3, this outlet comprises a vortex finder tube 37 which extends a short distance into the chamber, with an axial passageway 38 of relatively small diameter (e.g., 1/16 inch) through which the fluid concentrated near the axis is discharged. In the embodiment illustrated, the vortex finder tube is mounted on an endpiece 39 which has a flange 41 bolted to the inlet head and a stem 42 which extends through an axial bore 43 in the head. The endpiece also has a threaded fitting 44 which communicates with the passageway in the finder tube and provides means for connecting an outlet line to the separator.

The outlet head is similar to the inlet head, with the tangential opening serving as an underflow outlet 46 for the more dense fluid which is concentrated toward the outer wall of the chamber, and the axial bore 43 being closed by a suitable plug or cap (not shown).

A plurality of longitudinally extending impeller vanes 48 project inwardly in a radial direction from the side wall of cylinder 16 to enhance the rotation of the fluids within the chamber. These vanes are of limited axial extent and are located toward the inlet end of the cylinder. They are affixed to the side wall by suitable means such as brazing or welding.

In operation and use, a mixture of fluids to be separated, such as oil and water, is pumped into the separator through feed inlet 34 and enters the chamber with a tangential velocity which causes the fluid to rotate within the chamber. This rotation and the centrifugal forces resulting therefrom are increased by the rotation of the cylinder. The less dense fluid (e.g., oil) is thereby concentrated in a core near the axis and discharged through vortex finder tube 37, while the more dense fluid (e.g., water) is concentrated near the outer or side wall of the chamber and discharged through the tangential opening 46 in outlet head 29.

Figure 4:
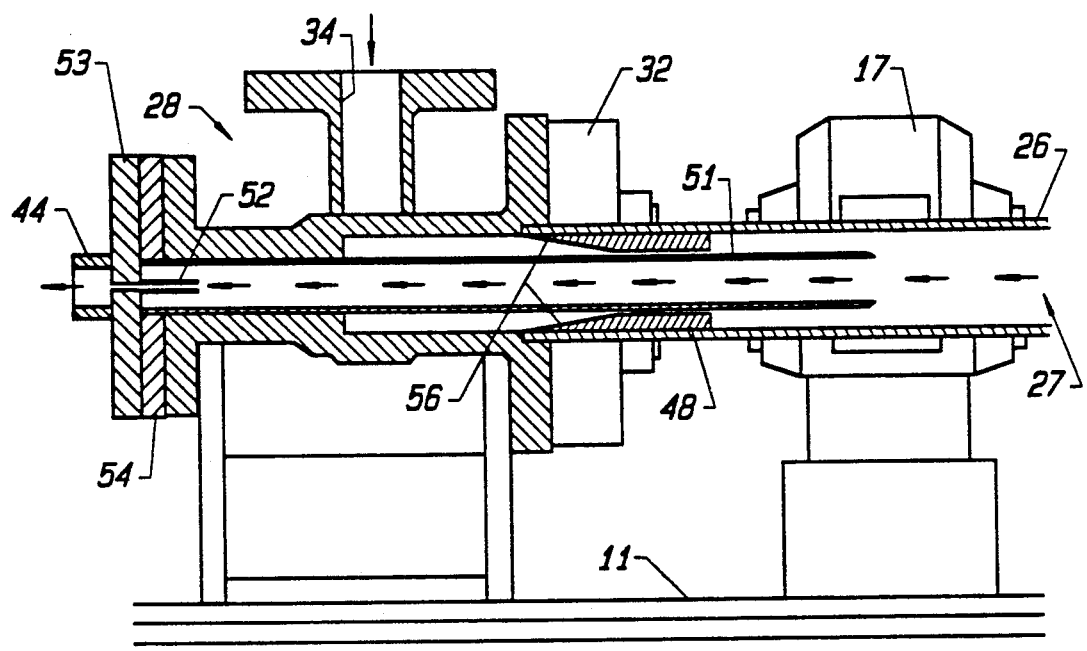
FIGS. 4 and 5 are enlarged fragmentary sectional views, similar to FIG. 3, of additional embodiments of a hydrocyclone separator according to the invention.

The embodiment of FIG. 4 is generally similar to the embodiment of FIG. 3, and like reference numerals designate corresponding elements in the two embodiments. In the embodiment of FIG. 4, however, a turbulence shield 51 is provided at the inlet end of the chamber to isolate the core of lighter fluid and the overflow outlet from the effects of turbulence produced by fluids entering the chamber and interacting with the impeller vanes. The shield comprises an elongated sleeve or tubular member which is mounted in the bore 43 in the inlet head and extends coaxially of the cylinder to a point well beyond the impeller vanes. The shield stabilizes the core of oil or other lighter liquid, prevents short circuiting between the feed inlet and the overflow outlet, and improves collection efficiency.

In the embodiment of FIG. 4, the overflow outlet comprises a vortex finder tube 52 which is set well back within the turbulence shield. This finder tube is carried by an end cap 53 which is bolted to the inlet head, with a gasket 54 providing a seal between the cap and the head.

Also, in the embodiment of FIG. 4, the end portions 56 of impeller vanes 48 are tapered toward the feed inlet, with the vanes increasing in radial extent or effective area along the length of the cylinder away from the feed inlet. This results in a relatively gradual increase in the angular velocity, or rotational acceleration, of the fluid as it travels through the chamber, thereby reducing the amount of turbulence produced by the vanes.

Operation and use of the embodiment of FIG. 4 are similar to that described above in connection with the embodiment of FIG. 3. In the embodiment of FIG. 4, the tapered vanes produce less turbulence than the straight vanes of FIG. 3, and the turbulence shield provides a quiescent zone in which the core of oil or other lighter fluid can stabilize, prevents short circuiting between the feed inlet and the overflow outlet, and improves collection efficiency. Since the shield extends well beyond the areas of turbulence produced by the feed entry and the rotating vanes, the core of oil and the overflow outlet are well isolated from both of these disturbances.

Figure 5:
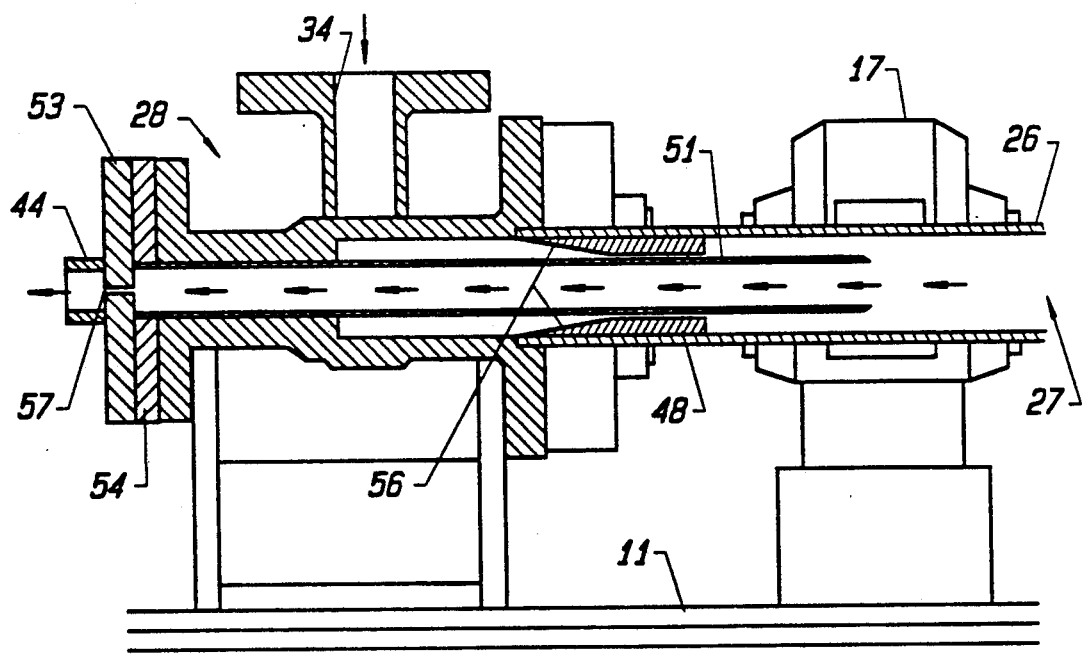

The embodiment of FIG. 5 is similar to the embodiment of FIG. 4, and like reference numerals designate corresponding elements in these two figures. The embodiment of FIG. 5 differs from the embodiment of FIG. 4, however, in that the overflow outlet comprises an axial opening 57 in end cap 53 instead of a vortex finder tube. Operation and use of this embodiment are substantially identical to that of FIG. 4.

It is apparent from the foregoing that a new and improved rotating hydrocyclone has been provided. While only certain presently preferred embodiments have been described in detail, as will be apparent to those familiar with the art, certain changes and modifications can be made without departing from the scope of the invention as defined by the following claims.

What is claimed is:

1. In a hydrocyclone for separating immiscible fluids of different specific gravities: an elongated cylinder having a side wall defining a separation chamber, an inlet with means for introducing a mixture of immiscible fluids into the chamber at high velocity in a tangential direction so that the mixture rotates about the axis of the chamber and produces a centrifugal force which tends to separate the fluids in accordance with their specific gravities with a fluid of lesser specific gravity forming into a core along the axis and a fluid of greater specific gravity being concentrated toward the side wall of the chamber, means for rotating the cylinder about its axis to increase the centrifugal force, a first outlet aligned with the axis of the cylinder for removing the core of fluid of lesser specific gravity from the chamber, a second outlet for removing the fluid of greater specific gravity from the chamber, and a cylindrical turbulence shield of greater diameter than the first outlet positioned between the inlet and the first outlet for isolating the core from the effects of turbulence produced by fluids entering the chamber as the core approaches the first outlet.

2. The hydrocyclone of claim 1 wherein the turbulence shield is disposed coaxially of the cylinder and extends from the first outlet past the inlet to a point within the cylinder beyond where turbulence is produced by fluids entering the chamber.

3. The hydrocyclone of claim 2 wherein the first outlet comprises an orifice at one end of the cylindrical shield.

4. The hydrocyclone of claim 1 wherein the cylinder has a plurality of tapered impeller vanes which increase in radial extent away from the inlet for gradually accelerating the rotation of the fluids as they move away from the inlet.

5. The hydrocyclone of claim 4 wherein the turbulence shield is disposed coaxially of the cylinder and extends from the first outlet past the vanes so as to also isolate the first outlet from the effects of turbulence produced by the vanes.

6. The hydrocyclone for separating immiscible fluids of different specific gravities: a base, a pair of bearing blocks mounted on the base, an elongated cylinder rotatively mounted in the bearing blocks and having a separation chamber formed therein with no housing or other supporting structure surrounding the cylinder, a stationary inlet head and a stationary outlet head mounted on the base in axial alignment with the cylinder and in fluid communication with the chamber at opposite ends of the cylinder, and a drive motor mounted on the base and connected to the cylinder between the inlet head and the outlet head for rotating the cylinder about its axis to produce a centrifugal force for separating fluids in the chamber in accordance with their specific gravities.

7. The hydrocyclone of claim 6 including a turbulence shield within the chamber near the inlet head for isolating fluid concentrated near the axis from turbulence produced by fluid entering the chamber.

8. The hydrocyclone of claim 7 wherein the turbulence shield comprises a tubular member disposed coaxially of the cylinder.

9. The hydrocyclone of claim 8 wherein the inlet head includes an axially disposed orifice at one end of the tubular member for removing fluids of lesser specific gravity from the chamber.

10. In a hydrocyclone for separating immiscible fluids of different specific gravities: an elongated cylinder having a side wall defining a separation chamber, a stationary inlet with means for introducing a mixture of immiscible fluids into the chamber at high velocity in a tangential direction so that the mixture rotates about the axis of the chamber and produces a centrifugal force which tends to separate the fluids in accordance with their specific gravities with a fluid of lesser specific gravity forming in to a core along the axis and a fluid of greater specific gravity being concentrated toward the side wall of the chamber, means for rotating the cylinder about its axis to increase the rotation of the fluids and thereby increase the centrifugal force, impeller vanes extending radially in an inward direction from the side wall of the cylinder near the inlet for enhancing the rotation of the fluids with the cylinder, a first outlet aligned with the axis of the cylinder for receiving the core of fluid of lesser specific gravity from the chamber, a second outlet for receiving the fluid of greater specific gravity from the chamber, and a tubular turbulence shield of greater diameter than the first outlet disposed coaxially of the chamber between the inlet and the first outlet and extending axially beyond the impeller vanes for isolating the the core of fluid of lesser specific gravity from the effects of turbulence produced by fluids entering the chamber and interacting with the impeller vanes as the core approaches the first outlet.

11. The hydrocyclone of claim 10 wherein the impeller vanes are tapered such that they increase in radial extent away from the inlet for gradually accelerating the rotation of the fluids as they move away from the inlet.

12. The hydrocyclone of claim 10 wherein the first outlet comprises a vortex finder tube which extends a limited distance within the tubular shield.

13. The hydrocyclone of claim 10 wherein the first outlet comprises an orifice at one end of the tubular shield.

14. In a hydrocyclone for separating immiscible fluids of different specific gravities: an elongated cylinder having a side wall defining a separation chamber, an inlet with means for introducing a mixture of immiscible fluids into the chamber at high velocity in a tangential direction so that the mixture rotates about the axis of the chamber and produces a centrifugal force which tends to separate the fluids in accordance with their specific gravities, means for rotating the cylinder about its axis to increase the centrifugal force, a first outlet comprising a vortex finder tube aligned with the axis of the cylinder for removing a fluid of lesser specific gravity from the chamber, a second outlet aligned tangentially with the cylinder for removing a fluid of greater specific gravity from the chamber, and a tubular turbulence shield positioned coaxially of the cylinder between the inlet and the vortex finder tube and extending from the inlet past the vortex finder tube for isolating the vortex finder tube from the effects of turbulence produced by fluids entering the chamber.

15. In a hydrocyclone for separating immiscible fluids of different specific gravities: a base, a pair of bearing blocks mounted on the base, an elongated cylinder rotatively mounted in the bearing blocks and having a separation chamber formed therein, a stationary inlet head and a stationary outlet head mounted on the base in axial alignment with the cylinder and in fluid communication with the chamber at opposite ends of the cylinder, a drive motor mounted on the base and connected to the cylinder for rotating the cylinder about its axis to produce a centrifugal force for separating fluids in the chamber in accordance with their specific gravities, and a plurality of tapered impeller vanes which increase in radial extent away from the inlet for gradually accelerating rotation of the fluids as they move away from the inlet.

16. In a hydrocyclone for separating immiscible fluids of different specific gravities: a base, a pair of bearing blocks mounted on the base, an elongated cylinder rotatively mounted in the bearing blocks and having a separation chamber formed therein a stationary inlet head and a stationary outlet head mounted on the base in axial alignment with the cylinder and in fluid communication with the chamber at opposite ends of the cylinder, a drive motor mounted on the base and connected to the cylinder for rotating the cylinder about its axis to produce a centrifugal force for separating fluids in the chamber in accordance with their specific gravities, a tubular turbulence shield disposed coaxially of the cylinder within the chamber near the inlet head for isolating fluid concentrated near the axis from turbulence produced by fluid entering the chamber, and a vortex finder tube which extends axially for a limited distance within the tubular shield for removing fluids of lesser specific gravity from the chamber.

* * * * *